March 30, 1926. 1,579,051
E. F. W. ALEXANDERSON
ELECTRIC SHIP PROPULSION
Filed Dec. 11, 1920 2 Sheets-Sheet 1
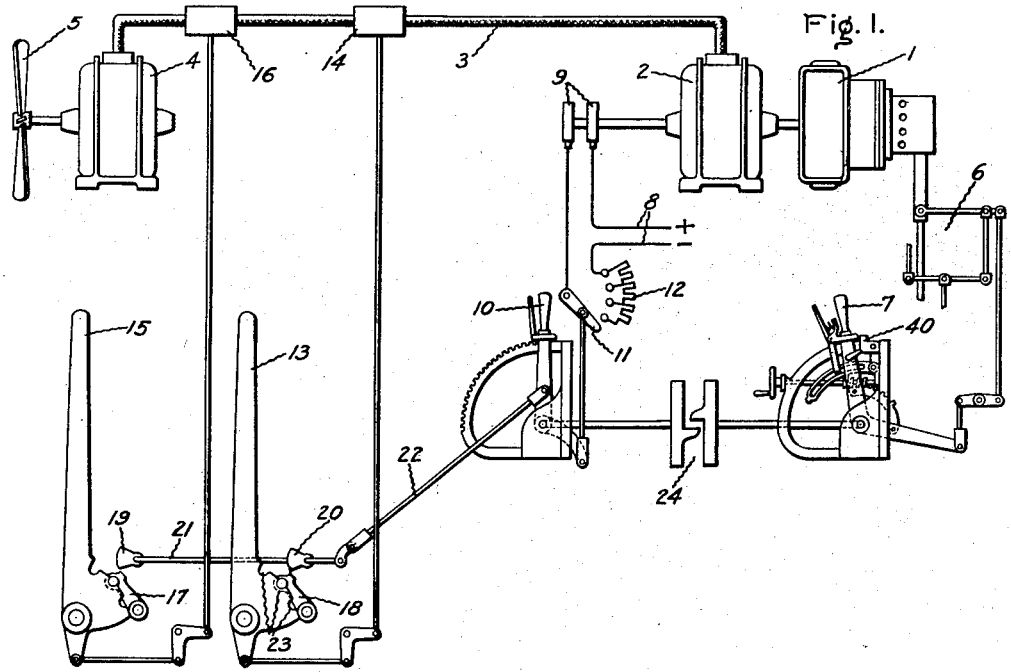
Inventor:
Ernst F.W. Alexanderson,
by Albert G. Davis
His Attorney.

March 30, 1926.
E. F. W. ALEXANDERSON
1,579,051
ELECTRIC SHIP PROPULSION
Filed Dec. 11, 1920
2 Sheets-Sheet 2
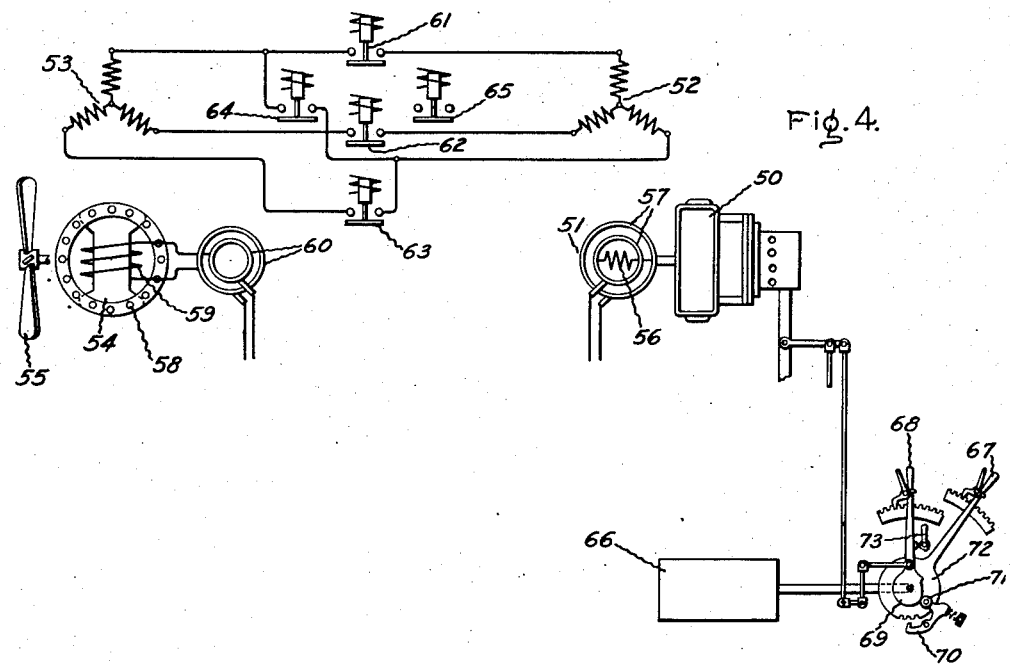
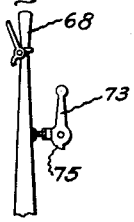
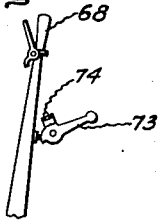
Inventor:
Ernst F. W. Alexanderson,
by Albert G. Davis
His Attorney.

Patented Mar. 30, 1926.

1,579,051

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC SHIP PROPULSION.

Application filed December 11, 1920. Serial No. 429,858.

*To all whom it may concern:*

Be it known that I, ERNST F. W. ALEXANDERSON, a citizen of the United States, residing at Schenectady, in the county of Schenectady, State of New York, have invented certain new and useful Improvements in Electric Ship Propulsion, of which the following is a specification.

My invention relates to systems of electric ship propulsion and more particularly to systems comprising an adjustable speed turbine which is arranged to drive a generator connected to supply a reversible motor, or motors, directly connected to a propeller or propellers.

An object of my invention is to provide apparatus which will facilitate the carrying out of maneuvering operations and which will not require great watchfulness and dexterity on the part of the operator to accomplish such operations.

My invention will be better understood from the following description taken in connection with the accompanying drawings, and its scope will be pointed out in the appended claims.

In the drawings Fig. 1 is a diagrammatic representation of a ship propulsion system comprising an induction motor for driving the propeller; Fig. 2 is an enlarged view of the steam control lever shown in Fig. 1; Fig. 3 is a detail of a stop device; Fig. 4 is a diagrammatic representation of a ship propulsion system of the synchronous motor type, showing a modified form of my apparatus, and Figs. 5 and 6 are details showing the steam lever and stop device in different positions.

Referring to Fig. 1, a turbine 1 is shown direct-connected to a synchronous generator 2, connected through mains, represented as a cable 3, to an induction motor 4, direct-connected to the propeller 5. The speed of the turbine is controlled by governing mechanism 6 for automatically maintaining any approximate speed which may be desired whether the turbine is loaded or unloaded. A speed adjusting lever mechanism 7 is provided whereby the governing mechanism may be adjusted to hold any desired speed. It is to be understood that my invention is not limited in any respect to any particular construction of governing mechanism for the turbine. The governing mechanism illustrated is of the type represented in the United States patent to Emmet No. 1,137,308, dated April 27, 1915.

Excitation is supplied to the generator 2 from any convenient source represented by the direct-current mains 8 connected to the slip rings 9. A field control lever 10 is arranged to open and close the field circuit and vary the strength of the generator excitation. Any suitable means may be provided for this purpose, and I have shown diagrammatically merely a movable arm 11, connected to the lever 10, arranged to close and open the excitation circuit as well as adjust the variable resistance 12. A reverse lever 13 is connected through any suitable lever mechanism to operate reversing switches 14 arranged in the mains 3 to change the direction of the motion of the ship. A pole changing lever 15 is connected through a suitable lever mechanism to operate pole changing switches 16 arranged to change the windings of the motor 4, in a manner well known in the art, to vary the normal speed of the motor corresponding to any given speed and frequency of the generator 2. It is important that the reversing and pole changing switches be operable only on a dead main circuit, and, to accomplish this result, an interlock is provided between these switches and the field lever 10. This interlock comprises a pair of pivoted dogs 17 and 18 arranged in cooperative relationship with a pair of cams 19 and 20 mounted on the shaft 21, connected by the rod 22 to the field lever 10. Reversing lever 13 is provided with a curved portion having three notches 23 which may be engaged by the dog 18. These notches are so located that they may be engaged by the dog when the switch is in either of its extreme "on" positions or in its intermediate or "off" position. Similar notches are provided on the pole changing lever 15. When the field lever 10 is thrown to a position in which the field circuit of the generator is open, the cams 19 and 20 swing clear of the dogs 17 and 18 so that the pole changing and reversing levers may be operated to accomplish the desired maneuvering operation. If either of these levers should be moved to less than the amount necessary fully to close or open the switches, one of the dogs 17 or 18 would be held upon the curved surface by the corresponding lever and one of the cams 19 or 20 would prevent operation of the field lever 10 to close the generator field circuit. With the levers moved to the proper position, however, the dogs fall into the notches so that the cams 19 and 20 are free to turn, thus making it possible to move the lever 10 to energize the generator field circuit.

In order to prevent the admission of more than a limited amount of steam to the turbine before the field circuit is closed, and to prevent the field being taken off the generator without first moving the speed control lever to a low steam position, an interlock 24 is provided between the steam lever 7 and field lever 10.

The steam lever 7, shown more clearly in Fig. 2, is arranged to be controlled for fine adjustment by means of the handwheel 25, arranged to operate a worm 26, arranged to engage the sector 27 of a worm-wheel secured to the arms of the bell crank steam lever 7. In order to enable a rapid and coarse adjustment of the speed to be made, a lifting lever 28 is provided, pivoted at 29 to the pivoted member 30, which is connected by links 31 to a pin 32 operating in the slotted quadrant mechanism 33, pivoted at 34, and provided with a pivotally mounted depending bearing 35 for the shaft of worm 26. Pin 32 is mounted in a pair of links 36 pivoted to the sides of lever 7. The engagement of hook 38 of pivoted member 30, with the projection 39 from the lever 7, holds the worm 26 normally in engagement with the sector 27. Upon pressing the lifting lever 28 the hook 38 is first disengaged from projection 39, after which further movement of lifting lever 28 causes a pivotal movement of member 30 to raise the slotted quadrant mechanism 33 by means of the links 31 and pin 32. The lifting of this mechanism causes worm 26 to be moved away from sector 27 leaving the handle free to be operated as long as the lifting lever 28 is held. In order to limit the movement of the lever 7 in the low speed direction, a stop device 40 is provided, and it is with the provision of this stop device that my present invention is concerned.

The torque required of a propeller driving motor is very large during certain maneuvering operations. The momentum of the ship dragging the propeller through the water causes the propeller to be driven with considerable power by the water as a turbine and it cannot be stopped unless a torque nearly equal to the full load torque of the motor is exerted to break the propeller away from the water. This maximum torque occurs at the speed of about 35 per cent. After this point has been passed, the propeller can easily be stopped and can be held with only 40 per cent of full load torque. The operation of the system during the reversing of the propeller is inherently unstable. During the first stage of the reversing process the propeller and turbine act as two motors bucking each other with unstable speed characteristics. It is a question whether the turbine is going to stall the propeller or the propeller is going to stall the turbine. It is the governor that introduces an artificial stability into this fundamentally unstable process of reversal, and, therefore, while the turbine governor should be set to hold a relatively low speed, it is at the same time imperative that the governor be operated within its working range. For proper operation the steam lever should be set so that the governor holds the generator at a speed within the working range of the governor and low enough so that the torque required to effect reversal will not be so great as to cause the motor to fall out of step. It is, however, frequently necessary in ship propulsion systems to adjust the governor for a speed of operation considerably below this proper maneuvering speed, as for example, when it is desired to run the equipment at a very low speed in order to keep headway or sternway in case of a storm, or for standby purposes. According to my invention means are provided to determine the proper maneuvering position of the steam lever without skill or care on the part of the operator. This means, as shown in Figs. 1, 2, and 3, comprises the stop device 40. This device is pivoted at 41 so as to be normally biased toward the position shown in these figures. A portion of the device 42 engages with the frame 43, upon which the steam lever is mounted, to limit the downward motion of the stop device. In the normal position of the stop device 40 a pin 44 lies in the proper position to engage a projection 45 from the side of the steam lever 7 to limit the motion of this lever in its steam reducing direction. The pin 44 is made adjustable to enable the stop device to be set at any desired maneuvering speed. Whenever the operator desires to proceed at a speed requiring a setting of the governor below that determined by the stop device, the stop device may be turned about its pivot 41 by one of the handles 46 to remove the pin 44 from the path of the projection 45. When turned to its upper limit, adjustable pin 47 of the stop device is brought into line with the projection 45 so that the operator may place the handle 7 at any point between the maneuvering speed position and the final position determined by the setting of pin 47. In order to insure that the stop device shall be returned to the maneuvering position whenever the demand for an abnormally low speed ceases, I have pivoted the stop device so that it is normally biased to the position shown in Fig. 3 where the pin 44 limits the movement of the steam lever to the maneuvering speed position. With this arrangement the operator when given a command to execute a certain maneuver, for example, that of reversing the ship, is required merely to throw the lever 7 as far as it will go in the steam reducing direction to secure the proper maneuvering speed adjustment of the governor.

It will be apparent to those skilled in the art that my invention is not confined to an induction motor ship propulsion system but, on the contrary, is applicable to any type of electric ship propulsion system in which the torque characteristics are such that the governor for the prime mover driving the generator requires a predetermined speed adjustment. Fig. 4 shows diagrammatically a ship propulsion system of the synchronous motor type. In this figure the turbine 50 drives the field element 51 of a synchronous generator. The stator 52 of the generator is connected to the stator 53 of the propeller driving motor, whose rotor 54 is connected to the propeller 55. Exciting current is supplied to the field winding 56 of the generator from any convenient source of direct-current by means of brushes engaging slip rings 57. The propeller driving motor comprises a squirrel-cage winding 58 preferably of the double squirrel-cage type for furnishing the torque necessary for acceleration and reversal of the ship. An exciting winding 59 is arranged to be supplied with direct current from any convenient source connected to brushes bearing on the slip rings 60. Contactor switches 61, 62, 63, 64 and 65 are provided for controlling and reversing the circuit between the generator and motor stator windings. These switches are represented as electro-magnetic switches and these switches are intended to be controlled from the controller drum 66 in a manner well known to those skilled in the art. In my compending application, Serial No. 358,973, filed February 16, 1920, for electric ship propulsion, of which this application is a continuation in part, I have disclosed and claimed several methods of operating a synchronous motor ship propulsion system of this type. One method of operating such a system comprises operating the motor as a braking generator to break the propeller from the water and bring it approximately to standstill, then operating the motor as an induction motor to reverse the propeller, and subsequently restoring the excitation to the motor to restore synchronous operation. When the motor is operating as a braking generator excitation is required on the motor. During the induction motor-action, over-excitation is required on the generator and no excitation on the motor, while during synchronous operation the excitation is required on both generator and motor. The control of the contactor switches and the excitation circuits of the generator and motor is effected in any suitable manner by the controller 66. While I have briefly sketched one method of control, it is obvious that my present invention is not limited to any particular method of control, and I have, therefore, shown no particular connections between the controller 66 and the circuits to be controlled. In my copending application referred to, I have also shown and described my stop device for defining the maneuvering position of the steam lever. The controller 66 is arranged to be operated by the controller lever 67. The steam lever 68 is arranged to control the turbine governor in the manner heretofore set forth in connection with the description of the system shown in Fig. 1. The electric controller lever 67 and the steam lever 68 are interlocked in a manner to insure that the turbine speed shall be reduced during maneuvering to enable the generator and motor readily to get into step. The steam lever 68 is provided with a cam member 69 cooperating with a pivoted locking member 70 provided with a roller 71 bearing on the cam surface. The electric controller lever 67 is provided with a member 72 provided with a plurality of notches in which the locking member 70 is arranged to engage. I have shown the member 72 as provided with three notches corresponding to the "off", "full speed ahead" and "full speed astern" positions of the electric controller. The cam surface of the member 69 is so arranged that the steam lever 68 must be moved approximately to the 25% speed position before the controller lever 67 can be moved. It is also apparent that the parts cooperate to prevent manipulation of the steam lever 68 unless the electric controller lever is in one of its three specified positions. A pivoted stop mechanism 73 having a projection 74 (see Figs. 5 and 6) is arranged normally to set the steam lever in the best maneuvering position and this position may be determined by varying the length of projection 74. This length may be varied in any desired manner, as for example, as shown in Fig. 3 in connection with stop pin 44. This stop member 73, like the stop member 40 heretofore described, is biased to a position in which it is adapted to engage the lever 68 in the maneuvering speed position, as shown in Fig. 5. If, however, it becomes desirable to operate at a still lower turbine speed, as heretofore set forth in connection with the description of the system shown in Fig. 1, the stop device 73 may be thrown to render the stop 74 ineffective and permit further movement of the lever 68, as shown in Fig. 6. The additional movement may be limited in any desired manner, but, as shown, the final stop is produced by the engagement of the lever 68 with the curve surface 75 of the member 73. As soon as the steam lever 68 is moved to increase the speed, stop device 73 falls back into place, locating the steam lever in the maneuvering position when it is again moved to reduce the turbine speed.

What I claim as new and desire to secure by Letters Patent of the United States, is:—

1. A ship propulsion system wherein a prime mover driven generator is arranged to supply current to a propeller driving motor and wherein means are arranged to control the generator and motor connections for maneuvering purposes, and wherein governing and speed adjusting means are arranged to control the prime mover, characterized by the fact that a stop mechanism is arranged normally to prevent movement of said speed adjusting means to a position below that where maneuvering may be successfully accomplished, and by the fact that said stop mechanism is arranged to be rendered ineffective where it is desired to run continuously at low speed.

2. An electric ship propulsion system comprising a propeller, an alternating current motor for driving said propeller, a synchronous generator for supplying said motor, an elastic fluid turbine for driving said generator, means for controlling the generator and motor connections for maneuvering purposes, a governor for said turbine, control means for said governor, the position of which determines the turbine speed, stop mechanism for said control means, baised to a position which defines a turbine speed suitable for maneuvering, and means whereby said stop mechanism may be moved to a position permitting a further reduction in turbine speed.

3. A ship propulsion system comprising a propeller, an alternating current motor for driving said propeller, a synchronous generator for supplying said motor, an elastic fluid turbine for driving said generator, means for controlling the generator and motor connections for maneuvering purposes, a governor for said turbine, a speed control lever for said governor to adjust the speed held by the governor, a stop device provided with a member projecting into the path of said speed control lever, said projecting member being adjustable to permit of the speed control lever being stopped at the position best suited for successful maneuvering, and a pivotal mounting for said stop device whereby the projecting member may be lifted out of the path of said control lever to permit the speed to be further reduced.

In witness whereof, I have hereunto set my hand this 10th day of December, 1920.

ERNST F. W. ALEXANDERSON